(12) United States Patent
Lyu et al.

(10) Patent No.: US 12,335,584 B2
(45) Date of Patent: Jun. 17, 2025

(54) METHOD AND SYSTEM FOR GENERATING SMART THUMBNAILS

(71) Applicant: Star India Private Limited, Mumbai (IN)

(72) Inventors: Shenglong Lyu, Beijing (CN); Jian Hui, Beijing (CN); Lu Zhang, Beijing (CN); Deming Lu, Beijing (CN); Tao Xiong, Beijing (CN)

(73) Assignee: STAR INDIA PRIVATE LIMITED, Mumbai (IN)

( * ) Notice: Subject to any disclaimer, the term of this patent is extended or adjusted under 35 U.S.C. 154(b) by 44 days.

(21) Appl. No.: 18/288,344

(22) PCT Filed: May 11, 2021

(86) PCT No.: PCT/CN2021/092947
§ 371 (c)(1),
(2) Date: Oct. 25, 2023

(87) PCT Pub. No.: WO2022/236651
PCT Pub. Date: Nov. 17, 2022

(65) Prior Publication Data
US 2024/0214651 A1    Jun. 27, 2024

(51) Int. Cl.
*H04N 21/8549* (2011.01)
*G06T 13/40* (2011.01)
(Continued)

(52) U.S. Cl.
CPC ......... *H04N 21/8549* (2013.01); *G06T 13/40* (2013.01); *G06T 13/80* (2013.01);
(Continued)

(58) Field of Classification Search
None
See application file for complete search history.

(56) References Cited

U.S. PATENT DOCUMENTS 8,078,603 B1   12/2011   Chandratillake et al.
9,892,324 B1    2/2018   Pachauri
(Continued)

FOREIGN PATENT DOCUMENTS

CN   101783886 A   7/2010
CN   102057351     5/2011
CN   109145152 A   1/2019

*Primary Examiner* — James R Marandi
(74) *Attorney, Agent, or Firm* — Evergreen Valley law Group; Kanika Radhakrishnan

(57) ABSTRACT

A method and system (150) for generating smart thumbnails is disclosed. The method includes receiving a thumbnail and metadata in relation to a content stored in a content store (152). The metadata is analyzed to identify a key content element of the content. If the key content element is present in the thumbnail, one or more features related to the key content element are extracted and caused to be animated to create an animated content element. One or more textual snippets are generated based on the metadata, and a textual snippet is converted into a speech form to configure an audio version of the textual snippet. The audio version is combined with the animated content element to create a speaking content element. The speaking content element is embedded in place of the key content element in the thumbnail to generate the smart thumbnail.

20 Claims, 11 Drawing Sheets

(51) Int. Cl.
    *G06T 13/80*      (2011.01)
    *H04N 21/84*      (2011.01)
    *H04N 21/8545*   (2011.01)

(52) U.S. Cl.
    CPC ......... *H04N 21/84* (2013.01); *H04N 21/8545* (2013.01); *G06T 2210/61* (2013.01)

(56) References Cited

U.S. PATENT DOCUMENTS

| | | | |
|---|---|---|---|
| 2006/0107289 A1* | 5/2006 | DeYonker | G11B 27/327 |
| | | | 725/38 |
| 2007/0203942 A1* | 8/2007 | Hua | G11B 27/105 |
| 2008/0086688 A1* | 4/2008 | Chandratillake | G06F 16/738 |
| | | | 707/E17.028 |
| 2019/0171338 A1* | 6/2019 | Voss | G06F 3/0482 |
| 2022/0124385 A1* | 4/2022 | Cuomo | H04N 21/4781 |

\* cited by examiner

METHOD AND SYSTEM FOR GENERATING SMART THUMBNAILS

TECHNICAL FIELD

The present technology generally relates to thumbnail images used in electronic devices and more particularly, to a method and system for generating smart thumbnails capable of recommending content to viewers for accelerating selection of the content by the viewers.

BACKGROUND

A thumbnail image or a thumbnail is a digital image of small file size often representing media content of larger file size. Some examples of the media content represented by thumbnails include video content such as live streaming or playback content, sports content, movie content, gaming content, application content, image content, textual content, and the like. The thumbnail is often displayed as a visual icon, which when selected triggers access to the media content represented by the thumbnail. The ability of the thumbnail to serve as a placeholder for media content has resulted in the widespread use of thumbnails in digital domains, which require organizing content due to the presence of a large number of content elements. For example, the data processing devices, like computers, use thumbnails to represent applications, text files, etc. Similarly, providers of streaming content use thumbnails for representing content titles to offer several content viewing options to the subscribers of the streaming content.

Most thumbnails include a combination of image content and textual content. For example, a thumbnail representing multimedia content, such as a movie, may include images of one or more lead artists in the movie and a textual title of the movie. In another illustrative example, a thumbnail of a virtual reality game may display imagery of a virtual environment likely to be encountered by a gaming participant along with a stylized text representing the name of the game. In many scenarios, a viewer of a thumbnail may wish to know more about the content represented by the thumbnail. For example, a viewer may wish to know a genre of the movie represented by a thumbnail. In some cases, the thumbnail of a movie may not display any artists or display only one lead artist and a viewer may wish to know about the other artists in the cast. Similarly, a gaming user may wish to know more details about the virtual reality game, such as the number of levels to be unlocked, number of members supported in each team, etc. The static nature of the thumbnails as well as the limited space available on the digital image configuring the thumbnails make it difficult to accommodate additional content on the thumbnail. Typically, an interested viewer may have to access another webpage to obtain desired additional information about the content. In some example scenarios, the interested viewer may click on the thumbnail or hover over the thumbnail to cause display of a trailer, which may be embodied as a video of a small duration to provide additional information related to the content to the viewer. The additional webpage access or viewing of the trailer for one or more content titles may be time consuming and also use up data resources of a viewer, which may not be preferred by the viewer. Moreover, the to-and-fro actions for viewing additional content for each content title may degrade a quality of interaction experience provided to a viewer. In some cases, viewers may also exit a content provider platform on account of the delay in shortlisting content of interest, leading to a loss of business for the content provider.

In light of the foregoing, there is a need to provide additional information on thumbnails to assist viewers in getting more information about the content represented by the thumbnails. It would also be advantageous to provide smart thumbnails, which are able to adapt to the viewer's preferences and also make the content more appealing for a viewer.

SUMMARY

In an embodiment of the invention, a computer-implemented method for generating a smart thumbnail is disclosed. The method receives, by a processing module of a system, a thumbnail and metadata in relation to a content stored in a content store. The method analyzes the metadata, by the processing module, to identify a key content element of the content. The method determines, by the processing module, presence of the key content element in the thumbnail. If the key content element is present in the thumbnail, the method extracts, by the processing module, a portion including the key content element from the thumbnail. The extraction of the portion includes, at least in part, extracting one or more features related to the key content element. The method causes, by the processing module, the one or more features of the key content element to be animated to create an animated content element. The method generates, by the processing module, one or more textual snippets in relation to the content. The one or more textual snippets are generated, at least in part, based on the metadata. The method converts, by the processing module, a textual snippet selected from among the one or more textual snippets into a speech form to configure an audio version of the textual snippet. The method combines the audio version of the textual snippet with the animated content element, by the processing module, to create a speaking content element. The speaking content element is configured to provide an impression of the key content element speaking the audio version of the textual snippet. The method embeds, by the processing module, the speaking content element in place of the key content element in the thumbnail to generate the smart thumbnail.

In an embodiment of the invention, a system for generating a smart thumbnail is disclosed. The system includes a memory module for storing instructions and a processing module configured to execute the instructions and cause the system to receive a thumbnail and metadata in relation to a content stored in a content store. The system analyzes the metadata to identify a key content element of the content. The system determines presence of the key content element in the thumbnail. If the key content element is present in the thumbnail, the system extracts a portion including the key content element from the thumbnail. The extraction of the portion includes, at least in part, extracting one or more features related to the key content element. The system causes the one or more features of the key content element to be animated to create an animated content element. The system generates one or more textual snippets in relation to the content. The one or more textual snippets are generated, at least in part, based on the metadata. The system converts the textual snippet selected from among the one or more textual snippets into a speech form to configure an audio version of the textual snippet. The system combines the audio version of the textual snippet with the animated content element to create a speaking content element. The speaking content element is configured to provide an impression of the key content element speaking the audio version of the textual snippet. The system embeds the speaking content element in place of the key content element in the thumbnail to generate the smart thumbnail.

In an embodiment of the invention, another computer-implemented method for generating a smart thumbnail is disclosed. The method receives, by a processing module of a system, a thumbnail and metadata in relation to a video content stored in a content store. The method analyzes the metadata, by the processing module, to identify a key cast member of the video content. The key cast member is chosen based on a preference of a viewer likely to view the video content. The method determines, by the processing module, presence of the key cast member in the thumbnail. If the key cast member is present in the thumbnail, the method extracts, by the processing module, a portion including the key cast member from the thumbnail. The extraction of the portion includes, at least in part, extracting one or more facial features related to the key cast member. The method causes, by the processing module, movement of the one or more facial features of the key cast member to create an animated key cast member. The method generates, by the processing module, a textual snippet including at least one of a description of the video content and a description of a role of the key cast member in relation to the video content. The textual snippet is generated, at least in part, based on the metadata related to the video content. The method converts, by the processing module, the textual snippet into a speech form to configure an audio version of the textual snippet. A language of the audio version is chosen based on a language preference of the viewer. The method combines the audio version of the textual snippet with the animated key cast member, by the processing module, to create a speaking cast member. The speaking cast member is configured to provide an impression of the key cast member speaking the audio version of the textual snippet. The method embeds, by the processing module, the speaking cast member in place of the key cast member in the thumbnail to generate the smart thumbnail.

DETAILED DESCRIPTION

Figure 1A:
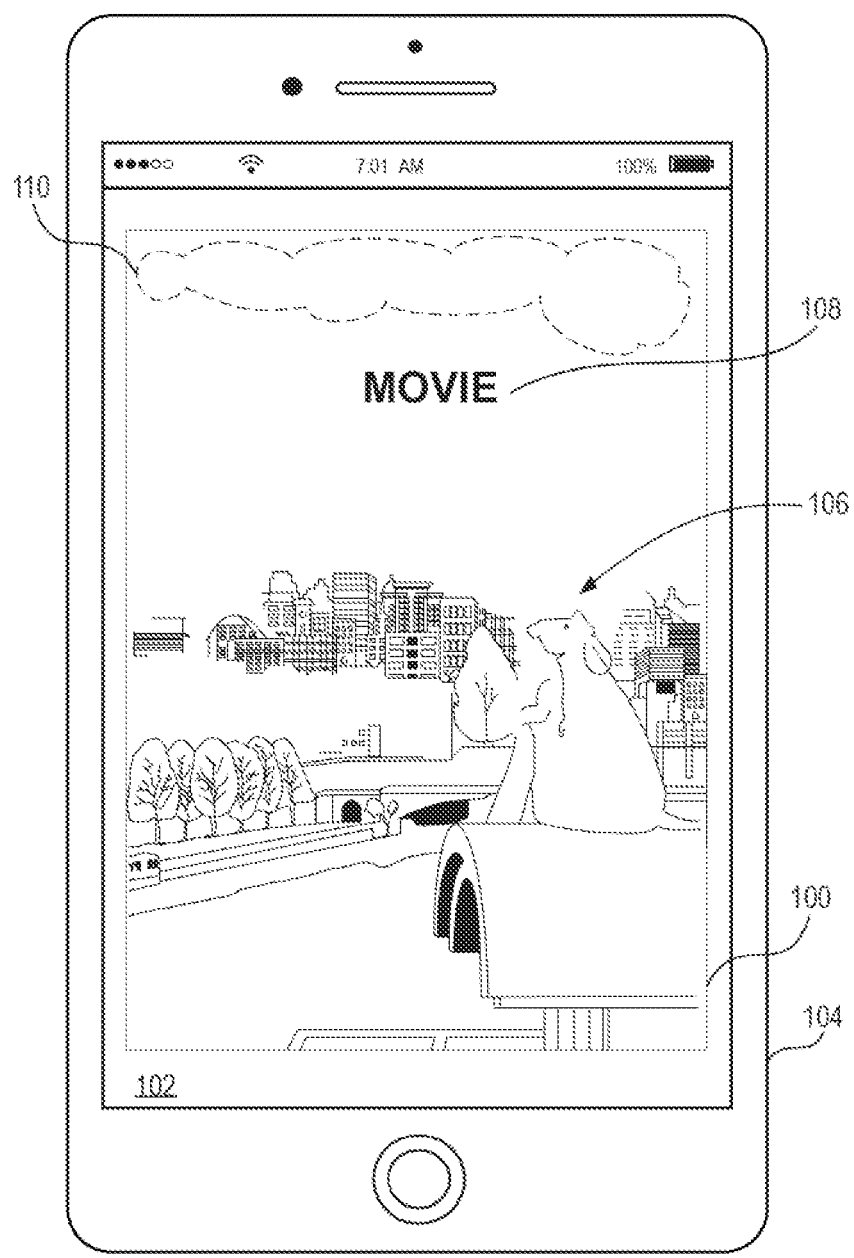
FIG. 1A shows a representation of a thumbnail, in accordance with an example scenario.

The detailed description provided below in connection with the appended drawings is intended as a description of the present examples and is not intended to represent the only forms in which the present example may be constructed or utilized. However, the same or equivalent functions and sequences may be accomplished by different examples.

FIG. JA shows a representation of a thumbnail 100, in accordance with an example scenario. The thumbnail 100 is depicted to be displayed on a display screen 102 of an electronic device 104. The electronic device 104 is depicted to be a smartphone for illustration purposes. It is understood that the thumbnail 100 is capable of being displayed on any electronic device with a display screen, such as a personal computer, a television, a laptop, a tablet device, a wearable device, and the like.

The thumbnail 100 is exemplarily depicted to be embodied as a digital image of a poster related to a movie. More specifically, the thumbnail 100 is depicted to be embodied as a digital poster of a movie. In other words, the thumbnail 100 is depicted to represent the movie and a click or a touch selection input on the thumbnail 100 is configured to trigger access to an option to play the movie from a remote content delivery network (CDN), such as a CDN associated with an over-the-top (OTT) streaming content provider. It is understood that the thumbnail 100 is depicted to represent the movie only for illustration purposes. Indeed the thumbnail 100 may represent any other movie or any other type of multimedia content, such as live streaming or playback video content, sports content, gaming content, application content, image content, textual content, and the like.

In an example scenario, a user (not shown in FIG. 1A) may have accessed a mobile application or a mobile Web user interface (UI) associated with a streaming content provider to watch a movie offered by the streaming content provider. The term 'streaming content provider' as used herein refers to an owner of digital video content libraries, who offers video content on a subscription basis by using a digital platform and over-the-top (OTT) media services, i.e. the video content is streamed over the Internet to the electronic devices of the subscribers. A streaming content provider is hereinafter referred to as a 'content provider' for ease of description. In scenarios where the thumbnail 100 represents non-movie content, the user may have accessed a mobile application or a mobile Web UI associated with an application store, a video-sharing platform such as YouTube®, a social media channel, etc., and the thumbnail 100 corresponding to an application or a media content may be presented to the user. It is noted that though the thumbnail 100 is described herein with respect to a movie content offered on a content provider platform, the scope of the present invention may not be limited to such a use of the thumbnail.

The thumbnail 100 is depicted to include an image portion 106 and a textual title 108, which together configure the content portion of the thumbnail 100. As can be seen, the remaining non-content portion of the thumbnail 100 (shown demarcated from the content portion and exemplarily depicted by numeral 110) is limited. The limited amount of remaining portion does not support inclusion of additional information on the thumbnail 100. If a user wishes to learn the movie genre or a story outline of the movie to decide whether the user should spend time to watch the movie, currently, the user may have to click on the thumbnail 100 and access an additional UI, which provides additional information about the movie. An example of such a UI is shown in FIG. 1B.

Figure 1B:
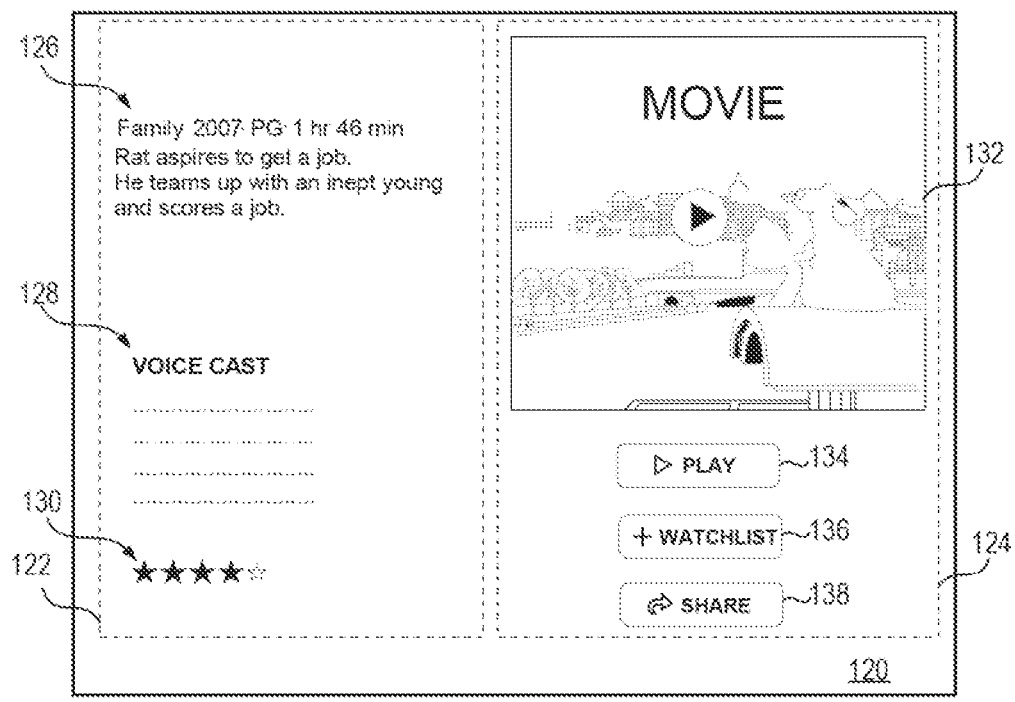
FIG. 1B shows a representation of an example UI displayed to a user on providing a selection input on the thumbnail of FIG. 1A, in accordance with an example scenario.

FIG. 1B shows a representation of an example UI 120 displayed to a user (not shown in FIG. 1B) on providing a selection input on the thumbnail 100 of FIG. 1A, in accordance with an example scenario. The UI 120 is exemplarily depicted to include a text portion 122 and a trailer portion 124. The text portion 122 is exemplarily depicted to include a synopsis 126 of the movie, a listing 128 of the cast involved in the making of the movie and a user rating 130 of the movie. The trailer portion 124 is depicted to include a short trailer 132 of the movie, which may entice the user to view the movie. The trailer portion 124 also includes selectable options 134, 136 and 138, which are associated with text 'PLAY'. 'WATCHLIST' and 'SHARE', respectively. The user may read the synopsis 126 and also view the trailer 132 of the movie to decide whether the user wants to watch the movie or not. If the user decides to watch the movie, the user may select the option 134 associated with the text 'PLAY' to initiate playback of the movie. However, if the user chooses to not watch the movie, the user may have to repeat the same routine with other content titles, i.e. access a UI to read synopsis and view video trailers of multiple content titles, which may delay a selection or shortlisting of content to play by the user and, which in turn may waste a lot of user's time and also consume data bandwidth.

Accordingly, a system configured to facilitate generation of smart thumbnails, which are capable of overcoming one or more drawbacks of the conventional thumbnails, is provided. The system is explained next with reference to FIG. 2.

Figure 2:
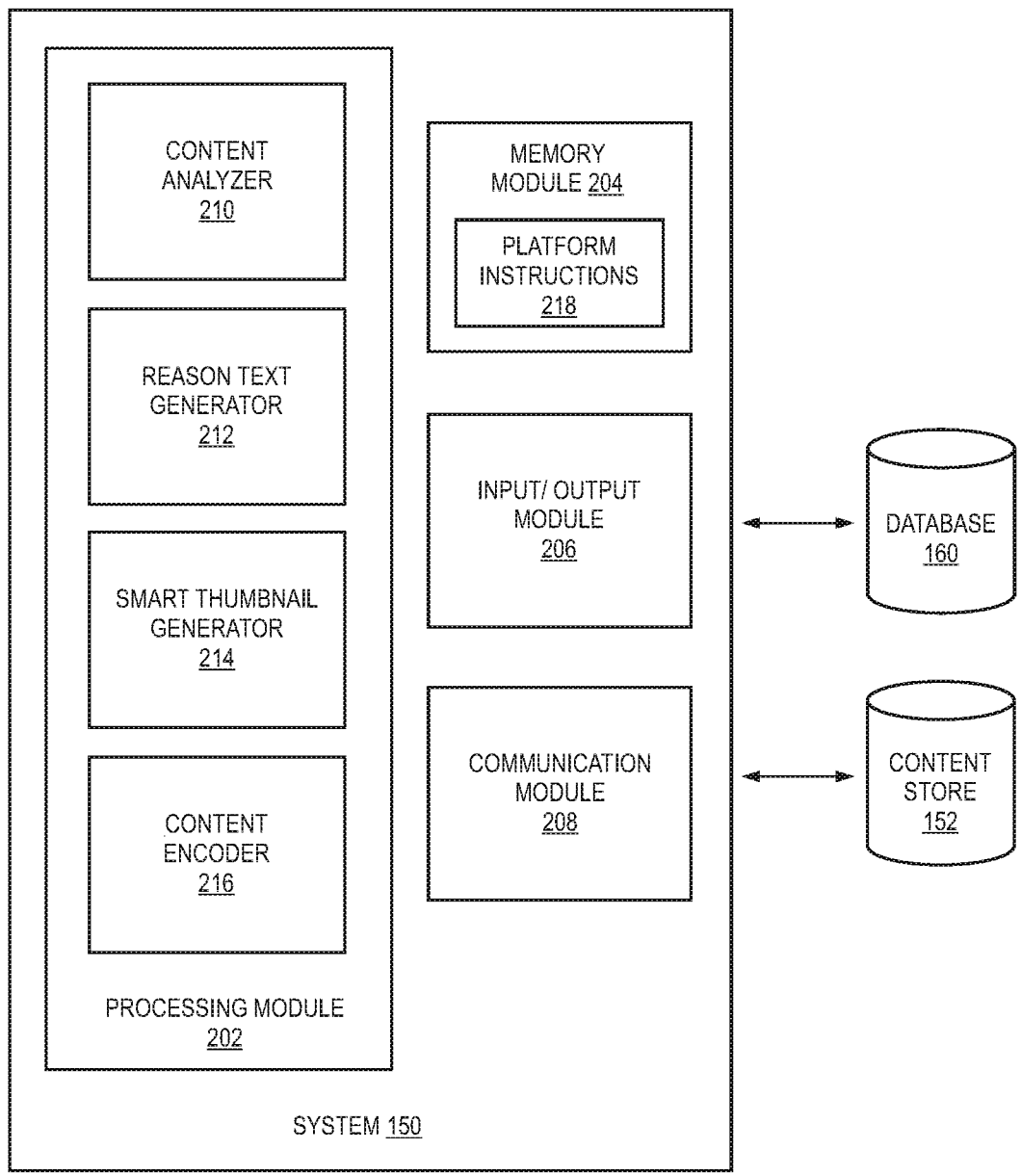
FIG. 2 is a block diagram of the system configured to facilitate generation of smart thumbnails, in accordance with an embodiment of the invention.

FIG. 2 is a block diagram of the system 150 configured to facilitate generation of smart thumbnails, in accordance with an embodiment of the invention. The system 150 may be embodied as a digital content processing system capable of receiving content from a plurality of content sources associated with an enterprise. Alternatively, the system 150 may be a standalone digital system configured to receive third-party content and automatically generate one or more smart thumbnails for each content. In at least one embodiment, the system 150 corresponds to a digital platform of an OTT content provider which is configured to facilitate provisioning of streaming content, such as live streaming content or video on-demand content, to a plurality of subscribers of the content.

The term 'smart thumbnail' as used throughout the description implies a thumbnail in which at least one image component displayed on the thumbnail is capable of being animated and provide an impression that the image component is talking, to a viewer when the viewer selects the thumbnail or hovers over the thumbnail. The animated image component in the thumbnail may talk about the content, in general, or his or her role in relation to the content. In at least some embodiments, the animated image component and an audio spoken by the animated image component may recommend the content to the viewer and entice the viewer of the smart thumbnail to consume the content represented by the smart thumbnail. Further, in at least some embodiments, the images on the smart thumbnail or the audio spoken by animated image components on the smart thumbnail may be customized to a viewer's preferences. The audio description provided by the smart thumbnail enables the thumbnail to overcome the drawback of limited space available on the thumbnail to accommodate additional information. Moreover, the audio description by the smart thumbnail avoids the need to access additional UIs or view data-bandwidth consuming trailers to determine whether to select the content or not.

The system 150 is depicted to include a processing module 202, a memory module 204, an input/output (I/O) module 206 and a communication module 208. The processing module 202 is further depicted to include a content analyzer 210, a reason text generator 212, a smart thumbnail generator 214 and a content encoder 216. It is noted that although the system 150 is depicted to include the processing module 202, the memory module 204, the I/O module 206 and the communication module 208, in some embodiments, the system 150 may include more or fewer components than those depicted herein. The various components of the system 150 may be implemented using hardware, software, firmware or any combinations thereof. It is also noted that one or more components of the system 150 may be implemented in a single server or a plurality of servers, which are remotely placed from each other. Further, individual components of the processing module 202, such as the content analyzer 210, the reason text generator 212, the smart thumbnail generator 214 and the content encoder 216 may be associated with respective sets of processor cores and memories for executing their functionalities. The processing module 202 and the memory module 204, in at least some embodiments, are configured to be collective embodiments of the processors and memories included in the respective components.

In one embodiment, the processing module 202 may be embodied as a multi-core processor, a single core processor, or a combination of one or more multi-core processors and one or more single core processors. For example, the processing module 202 may be embodied as one or more of various processing devices, such as a coprocessor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In one embodiment, the memory module 204 is capable of storing machine executable instructions, referred to herein as platform instructions 218. Further, the processing module 202 is capable of executing the platform instructions 218. In an embodiment, the processing module 202 may be configured to execute hard-coded functionality. In an embodiment, the processing module 202 is embodied as an executor of software instructions, wherein the instructions may specifically configure the processing module 202 to perform the algorithms and/or operations described herein when the instructions are executed.

The memory module 204 may be embodied as one or more non-volatile memory devices, one or more volatile memory devices and/or a combination of one or more volatile memory devices and non-volatile memory devices.

For example, the memory module 204 may be embodied as semiconductor memories, such as flash memory, mask ROM, PROM (programmable ROM), EPROM (erasable PROM), RAM (random access memory), etc. and the like.

In an embodiment, the I/O module 206 may include mechanisms configured to receive inputs from and provide outputs to the operator of the system 150. The term 'operator of the system 150' as used herein may refer to one or more individuals, whether directly or indirectly, associated with managing the digital platform, such as an OTT platform on behalf of the content provider. To enable reception of inputs and provide outputs to the system 150, the I/O module 206 may include at least one input interface and/or at least one output interface. Examples of the input interface may include, but are not limited to, a keyboard, a mouse, a joystick, a keypad, a touch screen, soft keys, a microphone, and the like. Examples of the output interface may include, but are not limited to, a display such as a light emitting diode display, a thin-film transistor (TFT) display, a liquid crystal display, an active-matrix organic light-emitting diode (AMOLED) display, a microphone, a speaker, a ringer, and the like.

In an example embodiment, at least one module of the system 150 may include I/O circuitry (not shown in FIG. 2) configured to control at least some functions of one or more elements of the V/O module 206, such as, for example, a speaker, a microphone, a display, and/or the like. The module of the system 150 and/or the I/O circuitry may be configured to control one or more functions of the one or more elements of the I/O module 206 through computer program instructions, for example, software and/or firmware, stored on a memory, for example, the memory module 204, and/or the like, accessible to the processing module 202 of the system 150.

The communication module 208 is configured to facilitate communication between the system 150 and one or more remote entities over a communication network. For example, the communication module 208 is capable of facilitating communication with servers associated with creation and storage of media content, content ingestion servers. Internet Service Provider (ISP) servers, electronic devices of content viewers, and the like.

The system 150 is depicted to be in operative communication with a content store 152 and a database 160. The content store 152 and the database 160 may be embodied as any computer-operated hardware suitable for storing and/or retrieving data. The content store 152 and/or the database 160 may include multiple storage units such as hard disks and/or solid-state disks in a redundant array of independent disks (RAID) configuration. In some embodiments, the content store 152 and/or the database 160 may include a storage area network (SAN) and/or a network attached storage (NAS) system. In one embodiment, the content store 152 and/or the database 160 may correspond to a distributed storage system, wherein individual databases are configured to store information as will be explained in further detail hereinafter.

In at least one embodiment, the content store 152 is configured to host (i.e. store) a plurality of media content. The content store 152 may receive the media content from content creators associated with an enterprise owning the content store 152 or from third-party content creation sources. In an illustrative example, the OTT content providers may implement content ingestion servers (not shown in FIG. 2) to ingest content from various content sources. The content store 152 may be in operative communication with content ingestion servers associated with one or more OTT platforms to receive latest content offerings from content production houses, media portals, and the like. Some non-limiting examples of the types of media content stored by the content store 152 include video content (like movies, news programs, personal channels such as those related to fitness, food preparation, décor, sports, etc.), audio content (such as movie songs, individual albums, instrumental music, etc.), games (such as single-player or multi-player games, Artificial/Virtual Reality games, etc.), image content (such as wildlife or nature photography, celebrity photos, event snapshots, and the like), textual content (such as books, magazines, blogs, etc.), and any combinations thereof. The content store 152 may also include any live streaming, playback, recorded or on-demand content capable of being digitally served to a user on a user device.

Further, the content store 152 may also store metadata and one or more thumbnails related to the stored content. For example, in case of movie content, the metadata may include information related to the duration of the movie, release date of the movie, the cast of the movie, the movie genre, average movie rating provided by viewers on popular ratings sites, etc. Additionally, the metadata may also include at least one of a synopsis of the movie (i.e. a brief story outline), a video trailer related to the movie, a brief description of the role(s) of one or more main characters associated with the content, and the like. Similarly, the metadata for a gaming content may include details related to the creator of the game, information related to graphics card support needed in the user's electronic device, the number of players or teams that can participate in the game, the number of levels to unlock, and the like.

The database 160 may include information related to profiles of users (also referred to herein as 'viewers'), who have viewed the content in the past or may view the content in future. For example, a user profile may include information gleaned from user accounts, such as name of the user, the location of the user, the age-group of the user, the type of content that the user has accessed in the recent past, historie content preferences of the user such as whether the user prefers movie content or audio content, the celebrities or movie artists the user is interested in, the language preference of the user, and the like. The information related to the existing and potential users may be obtained from users during user account setup and/or from data extracted from user behavior on the content provider platform and/or from events on social feeds such as events related to user comments/ratings/reviews, or any such other sources of information.

In at least one embodiment, the various components of the system 150 may utilize the communication module 208 to be in operative communication with the content store 152 and the database 160. For example, the content analyzer 210 in the processing module 202 may be configured to periodically poll the content store 152 to check for addition of any new content. Alternatively, the content store 152 may be configured to provide a messaging notification to the content analyzer 210 on addition of each new content in the content store 152.

On addition of new content in the content store 152, the content analyzer 210 is configured to check if the new content stored in the content store 152 is associated with metadata and at least one thumbnail. It is noted that in some scenarios, the new content added to the content store 152 may be stored as standalone content and may not be associated with metadata or thumbnail, whereas in some scenarios, the new content added to the content store 152 may be associated with metadata but no thumbnails. Yet, in some scenarios, the new content added to the content store 152 may be associated with both metadata and one or more thumbnails. Accordingly, the content analyzer 210 is first configured to check whether the new content added to the content store 152 is associated with metadata and a thumbnail. If it is determined that the new content is not associated with the metadata and/or a thumbnail, then the content analyzer 210 is configured to cause generation of the metadata and at least one thumbnail in relation to the content.

In at least one embodiment, the metadata is generated, at least in part, based on the content. In some embodiments, the content analyzer 210 may be configured to analyze the new content and generate metadata. Some non-limiting examples of the metadata generated by the content analyzer 210 may include listing of one or more content elements in the content, a brief description of the content, a role description of one or more content elements in the content, and the like. The term 'content element' as used herein implies any character or personnel involved in generating or promoting the content. For example, if the content corresponds to a movie content, then the content element may imply any member of the movie cast or any other support personnel directly or indirectly related to the movie. In an illustrative example, a content element of a movie may correspond to a lead actress or a director of the movie. If the content corresponds to gaming content, then the content element may imply a digital character present in the game, a maker of the game, a reviewer of the game, and the like. The content analyzer 210 may be configured to analyze the content to determine the content elements associated with the content. For example, the content analyzer 210 may be configured to use face detection or face identification technology to identify one or more actors involved in the movie content.

Further, the content analyzer 210 may be configured to retrieve other components of the metadata, such as the movie genre, the brief outline of the movie or the role of the content elements in the content from one or more content aggregators, media portals, blogs, and the like. For example, a cast member of the content may have provided an interview to a media channel, and portions of the interview may be gleaned to extract the brief outline of the movie and/or the role of the cast member in the movie content.

Accordingly, as explained above, the content analyzer 210 may generate metadata in scenarios where the newly added content in the content store 152 is not associated with metadata or a thumbnail. Further, the content and the metadata may be used to generate one or more thumbnails in scenarios, where the newly added content in the content store 152 is not associated with a thumbnail.

To this effect, in at least one embodiment, the content analyzer 210 of the processing module 202 is configured to predict at least one content element preference of the viewer. The content analyzer 210 may then be configured to generate one or more thumbnails based on the content and the metadata such that the generated thumbnail includes the at least one content element preference of the viewer. In an illustrative example, a viewer may have exhibited a likelihood to watch content directed by a particular movie director. In such a scenario, the movie director may be predicted as one of the content element preferences of the viewer and accordingly, if the preferred movie director is associated with the newly added content, then a thumbnail including the movie director may be generated by the content analyzer 210 of the processing module 202. In some scenarios, if data related to a viewer's historic viewing patterns is not available to predict content element preferences of a viewer with a reasonable amount of certainty, in at least some embodiments, the content analyzer 210 may be configured to take into account information related to the viewer, such as the viewer's age, gender, location, etc. to identify a matching demographic profile, and thereafter predict content element preferences of the viewer. It is noted that the generation of the thumbnail may involve aspects related to the selection of a background theme, text font, colors, etc. In at least some embodiments, the content analyzer 210 may also be configured to predict viewer's preferences in relation to background themes, colors, fonts, etc. and generate one or more thumbnails while taking into account the preferences of the viewer. In some embodiments, the content analyzer 210 may use known techniques for generating thumbnails from the content, the metadata, and the predicted content element preferences of the viewers.

In scenarios, where the newly added content in the content store 152 is associated with the metadata and one or more thumbnails, the content analyzer 210 is configured to extract one or more thumbnails, the synopsis of the content and other metadata related to the content from the content store 152. Further, the content analyzer 210 is configured to perform an analysis of the content to determine a suitability of the thumbnail to the content based on the synopsis of the content and the other metadata related to the content. For example, the content analyzer 210 may initially determine the type of content that the thumbnail is representing. If the thumbnail represents an application or a lighter version of a high resolution image, then the content analyzer 210 may skip further analysis of the content to determine the suitability of the thumbnail to the content. However, if the thumbnail corresponds to a movie, an audio song or a literary work, then the content analyzer 210 may be configured to perform further analysis.

To this effect, in at least one embodiment, the content analyzer 210 is configured to identify a key content element in relation to the content. In an illustrative example, the lead artist in the movie may be identified as the key content element in the movie content. In another illustrative example, a key contributor to an audio album, such as a vocalist, a lyricist, a musician such as a drummer or a guitarist, etc., may be identified as the key content element of the audio content. To identify the key content element in relation to the content, in at least one embodiment, the content analyzer 210 may determine if the metadata includes a listing of one or more content elements in relation to the content. If the metadata includes a listing of one or more content elements, then the content analyzer 210 is configured to determine a number of occurrences of each content element in at least one of the metadata and the content. A content element associated with the highest number of occurrences may then be considered as the key content element in relation to the content by the content analyzer 210. For example, the number of appearances of various elements in the video trailer or any teaser content may be determined and the elements associated with the highest number of appearances in the video trailer or in the teaser content may be identified as the key content elements in the content. Alternatively, a key content element may be identified from the synopsis of the content or from the metadata received in relation to the content. If it is determined that the content only includes one key content element and that key content element is displayed in the received thumbnail image received from the content store 152, then the content analyzer 210 is configured to skip further analysis of the content to determine the suitability of the thumbnail to the content.

However, if it is determined that the thumbnail image received from the content store 152 does not include the key content element or if it is determined that the key content element included in the thumbnail is not of viewer's preference, then in at least some embodiments, the content analyzer 210 may be configured to automatically generate a different thumbnail image or a new thumbnail image including the key content element, which is also a content element preference of the viewer. It is noted that in some embodiments, the content analyzer 210 may also skip generation of the thumbnail image if the key content element is not included in the only thumbnail image received from the content store 152.

In scenarios, where more than one key content element was identified in the content and a thumbnail image received from the content store 152 includes only some key content elements, then it is determined whether a viewer would prefer to view the remaining key content elements in the thumbnail. In such a scenario, the content analyzer 210 may be configured to automatically generate a thumbnail image including the preferred key content elements. In an illustrative example, a movie content may include two lead artists, such as a female lead artist and a larger-than-life villain. If the viewer would prefer to see only the female lead artist and not a thumbnail with only the larger-than-life villain or an image including the female lead artist and the larger-than-life villain, then the content analyzer 210 may first identify if such a thumbnail was received from the content store 152. If another thumbnail was received from the content store 152 which includes only the female lead artist, then the content analyzer 210 is configured to select such a thumbnail as the suitable thumbnail for the content.

Accordingly, in at least one embodiment, each content may be associated with a plurality of thumbnails with different key content elements appearing on different thumbnails. The content analyzer 210 is configured to select for each viewer, a thumbnail from among the plurality of thumbnails associated with a content, which is capable of eliciting maximum interest from the respective viewer. The selection of the thumbnail may be performed based on viewer preferences, which in turn may be derived from the viewer's past behavior. The generation and/or selection of a thumbnail for smart thumbnail generation is further explained with reference to FIG. 3.

Figure 3:
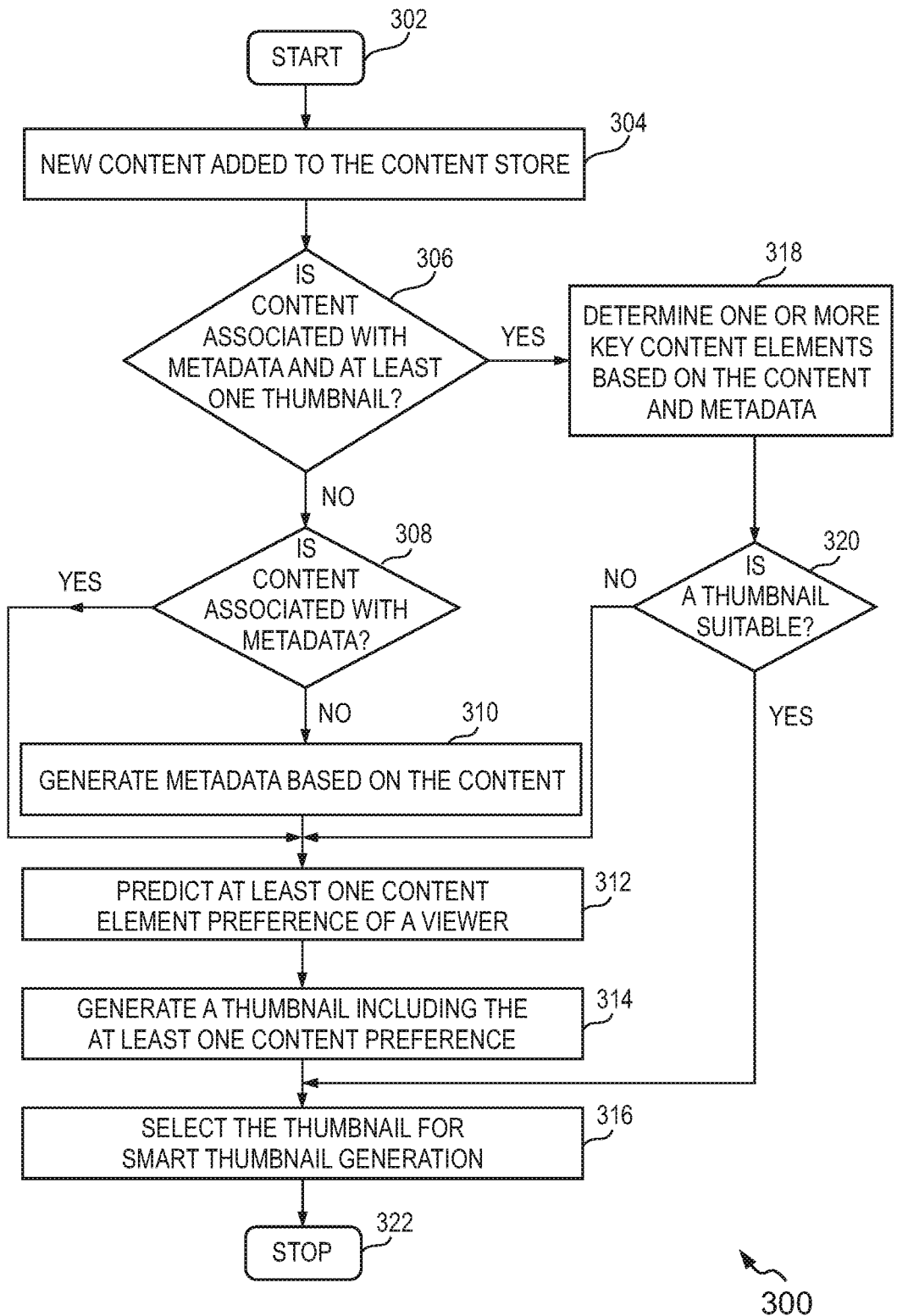
FIG. 3 is a flow diagram for illustrating analysis performed by a content analyzer, in accordance with an embodiment of the invention.

Referring now to FIG. 3, a flow diagram 300 is depicted for illustrating analysis performed by the content analyzer 210, in accordance with an embodiment of the invention.

The flow diagram 300 starts at 302. At 304, the content analyzer 210 learns about the addition of the new content in the content store 152. At 306, the content analyzer 210 checks whether the content is associated with metadata and at least one thumbnail.

If it is determined that the content is not associated with metadata and at least one thumbnail, then 308 is performed. Else, 318 is performed. At 308, it is determined whether the content is associated with metadata, but no thumbnails. If the content is not associated with metadata, then at 310, the metadata is generated by the content analyzer 210 based on the content. At 312, at least one content element preference is predicted for a viewer likely to view the content. At 314, a thumbnail including the at least one content element preference is generated from the content and the metadata. The prediction of the content element preference and the generation of the thumbnail based on the prediction of the content element preference may be performed as explained above and is not explained again herein. At 316, the generated thumbnail is selected for smart thumbnail generation by the content analyzer 210.

At 308, if it was determined that the content is associated with metadata (but with no thumbnails), then the flow diagram skips 310 and proceeds to 312 and continues thereafter. At 306, if it was determined that the content is associated with the metadata and at least one thumbnail, then at 318, a key content element in relation to the content is determined based on the content and the metadata. At 320, a suitability of the thumbnail is determined based on the key content element. More specifically, as explained with reference to FIG. 2, it is determined whether the key content element is included in the one or more received thumbnails. If the key content element is not included in the thumbnails, then the received one or more thumbnails are considered to be not suitable and the flow diagram 300 jumps to 312 and continues thereafter to generate the thumbnail. If the key content element is included in the received thumbnails, then it is determined whether the key content element is a content element preference of the viewer. If the key content element included in the one or more received thumbnails is not a content element preference, then a different thumbnail (i.e. a new thumbnail) is generated and the flow diagram 300 jumps to 312 and continues thereafter to generate the thumbnail. Further, if the content includes more than one key content element, then it is determined whether the received thumbnails include the appropriate key content elements. If not, then a different thumbnail (i.e. a new thumbnail) l is generated and the flow diagram 300 jumps to 312 and continues thereafter to generate the thumbnail. If a thumbnail includes the key content element, which is of viewer preference, then the thumbnail is considered to be suitable and such a thumbnail is selected at 316 for smart thumbnail generation. The flow diagram 300 ends at 322 with the selection of the thumbnail, which is appropriate for the smart thumbnail generation.

Referring back to FIG. 2, the content analyzer 210 is further configured to provide the selected thumbnail to the smart thumbnail generator 214. Further, the content analyzer 210 is configured to provide the synopsis and the metadata related to the content to the reason text generator 212.

In at least one embodiment, the reason text generator 212 of the processing module 202 may be capable of storing a plurality of snippet templates. Each snippet template is configured to provide an outline for describing the content or a role of a content element in the content to potential viewers of the content. The plurality of snippet templates includes templates corresponding to a plurality of content genres and a plurality of roles of content elements. Further, each snippet template includes one or more customizable portions. More specifically, each snippet template includes a brief textual summary with omissions or blanks, which are then filled out with content-specific or role-specific information based on the choice of the content element (i.e. the identified key content element), the synopsis of the content and the metadata related to the content received from the content analyzer 210.

In an illustrative example, the snippet templates may be predefined based on the type of content, the genre of the content, the number of key content elements in the content, etc. The reason text generator 212 is configured to receive the identification of the key content element, the synopsis of the content and the metadata related to the content and select a snippet template from among the plurality of snippet templates for generating a 'textual snippet'. The term 'textual snippet' as used herein implies a brief textual description of the content represented by the thumbnail or a brief textual description of a role of the key content element associated with the content. The snippet template is then customized based on the content-specific or role-specific details. In an illustrative example, for a movie, which is an animation-type movie and associated with comedy genre, a snippet template with a following piece of text may be chosen by the reason text generator 212:

"This hilarious animation movie is a joy to behold. This is a story of _____, who _____. Join _____ in this wonderful Journey as _____."

Such a predefined snippet template may then be populated with movie-specific details to generate the textual snippet as exemplarily depicted below:

"This hilarious animation movie is a joy to behold. This is a story of a rat, who aspires to be in a profession which has aversion to rodents. Join me in this wonderful Journey as the world is turned upside-down."

It is noted that, in at least some embodiments, the snippet template may also be customized as per viewer preferences. Further, it is noted that the scope of the invention may not be limited to the snippet template illustrated above. Indeed various types of snippet templates may be maintained by the reason text generator 212 to cater to a wide variety of media content and a wide range of roles of content elements. For example, in the aforementioned example, the reason text generator 212 may first classify the movie as an animation movie from among various movie categories, such as a mainstream movie, a sports related movie, a biopic, a documentary, and the like. Within the animation movie category, the reason text generator 212 may identify an appropriate sub-category 'comedy' from among various sub-categories such as action, horror, romantic and the like. For each of these categories and sub-categories, the reason text generator 212 may store one or more snippet templates. An appropriate snippet template may be selected based on at least one of a content genre associated with the content and a choice of key content element from the content for generating the smart thumbnail and the snippet template may then be customized as explained above.

In at least one embodiment, the reason text generator 212 is configured to provide the textual snippet to the smart thumbnail generator 214. The smart thumbnail generator 214 is configured to receive the textual snippet from the reason text generator 212 and the thumbnail from the content analyzer 210. The generation of the smart thumbnail by the smart thumbnail generator 214 is explained next with reference to FIG. 4.

Figure 4:
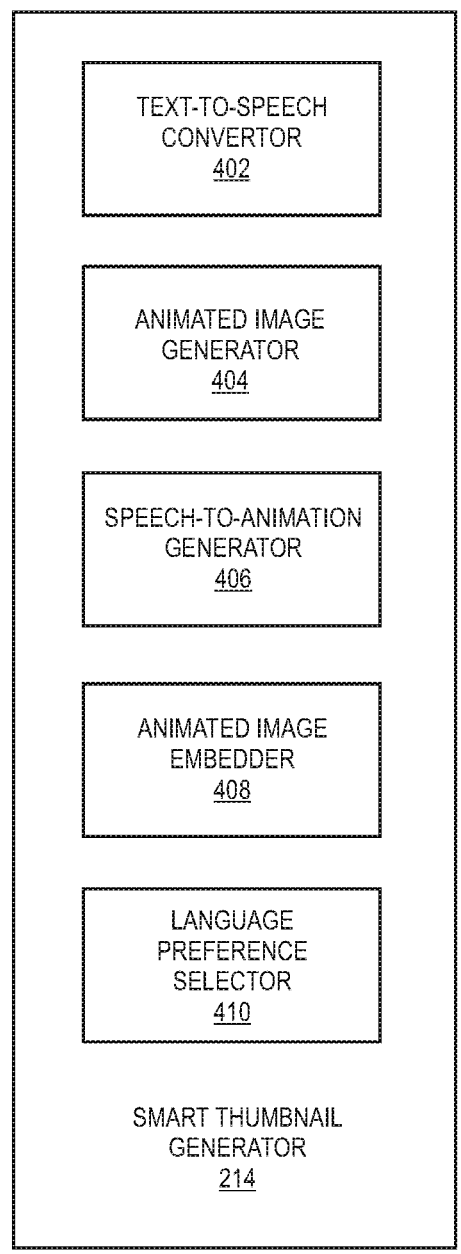
FIG. 4 is a block diagram of a smart thumbnail generator, in accordance with an embodiment of the invention.

Referring now to FIG. 4, a block diagram of a smart thumbnail generator 214 is shown, in accordance with an embodiment of the invention. The smart thumbnail generator 214 is depicted to include a text-to-speech convertor 402, an animated image generator 404, a speech-to-animation generator 406, an animated image embedder 408 and a language preference selector 410.

As explained with reference to FIG. 2, the smart thumbnail generator 214 is configured to receive the thumbnail from the content analyzer 210 and the textual snippet from the reason text generator 212. Further, as explained with reference to FIG. 2, the textual snippet includes a brief textual description of the content or a role of the key content element in the content that is tailored to entice viewers to watch the content. In at least one embodiment, the text-to-speech convertor 402 is configured to convert the textual snippet in a speech form that constitutes an audio version of the textual snippet. In at least one embodiment, the audio version of the textual description, hereinafter referred to as an 'audio description', is configured to mimic the voice of the key content element in the thumbnail. For example, if a lead artist in an audio content is displayed on the thumbnail, then the audio version of the textual snippet, i.e. the audio description, is configured to match the voice of the lead artist. In some embodiments, the voice of the lead artist may be extracted from the content trailer or from the content itself, and used for generating the audio description. Alternatively, in some embodiments, a default voice identified to create a desired enticing effect on the viewers may be used for generating the audio description. Further, in at least some embodiments, a language preference of each viewer may be identified by the language preference selector 410 based on historic preferences and/or user profile explained with reference to FIG. 2. For example, if a viewer has historically preferred to watch content in a regional language, then the audio description of the textual snippet may be generated in the preferred regional language to increase the appeal of the content to the viewer. Accordingly, the text-to-speech convertor 402 may be configured to be in operative communication with the language preference selector 410 to generate audio descriptions for a given content or role in multiple languages. Further, as explained above, in addition to the preferred language, the voice of the key content element (for example, the lead artist) may be chosen by the text-to-speech convertor 402 to generate the audio descriptions in multiple languages.

In at least one embodiment, the animated image generator 404 is configured to receive the thumbnail and extract a portion including the at least one key content element in the thumbnail. Further, the animated image generator 404 is configured to extract one or more features from the key content element included in the portion. For example, the animated image generator 404 may extract the facial outline, the placement of the facial features such as eyes, nose, mouth and ears, etc. in relation to at least one key content element in the portion. Further, the animated image generator 404 animates the key content element in the portion by causing movement of one or more extracted features so as to provide an impression that the key content element is speaking. For example, the lead artist in the movie, whose image is included in the thumbnail, may be animated to create an impression that the lead artist is speaking. More specifically, a movement of the facial features of the lead artist, such as a lip movement and/or movement of the eyes may be controlled so as to provide an impression that the lead artist is speaking. Such a modified key content element is also referred to herein as the animated content element. In some embodiments, the expressions of the key content element may be extracted from the video trailer or from the content itself, and used for animating the key content element to configure the animated content element. Alternatively, in some embodiments, default expressions identified to create a desired enticing effect on the viewers may be used for generating the audio description. Furthermore, in at least one embodiment, the animated image generator 404 may be configured to receive the audio description as an input to cause movement of one or more extracted features so as to provide an impression that the key element is speaking the audio associated with the audio description.

In at least one embodiment, the speech-to-animation generator 406 is configured to receive the portion with the animated content element from the animated image generator 404 and the audio version of the textual snippet (i.e., the audio description) from the text-to-speech convertor 402. The speech-to-animation generator 406 is configured to combine the animated content element with the audio description of the textual snippet such that an impression of the animated content element speaking the audio corresponding to the textual snippet is created. More specifically, the animated movements of the key content element are synchronized with the audio description to create the impression of the animated content element speaking the audio corresponding to the textual snippet. The animated content element speaking the audio corresponding to the textual snippet is referred to herein as the speaking content element. In at least one embodiment, the speech-to-animation generator 406 is configured to provide the speaking content element to the animated image embedder 408, which is configured to embed the speaking content element in place of the original image of the key content element in the selected thumbnail, or more specifically, replace the static image of the key content element in the thumbnail with the animated image of the speaking content element, thereby generating a smart thumbnail.

Referring now to FIG. 2, in at least one embodiment, the smart thumbnail generator 214 may provide the smart thumbnail to the content encoder 216. The content encoder is configured to use known encoding techniques, such as MPEG-4 or H.264 for encoding the smart thumbnail. The encoded smart thumbnail may then be stored in the database 160. The encoded smart thumbnail may be retrieved from the database 160 when a UI including the smart thumbnail is accessed by the viewer.

An example process flow for generating the thumbnail is explained next with reference to FIG. 5.

Figure 5:
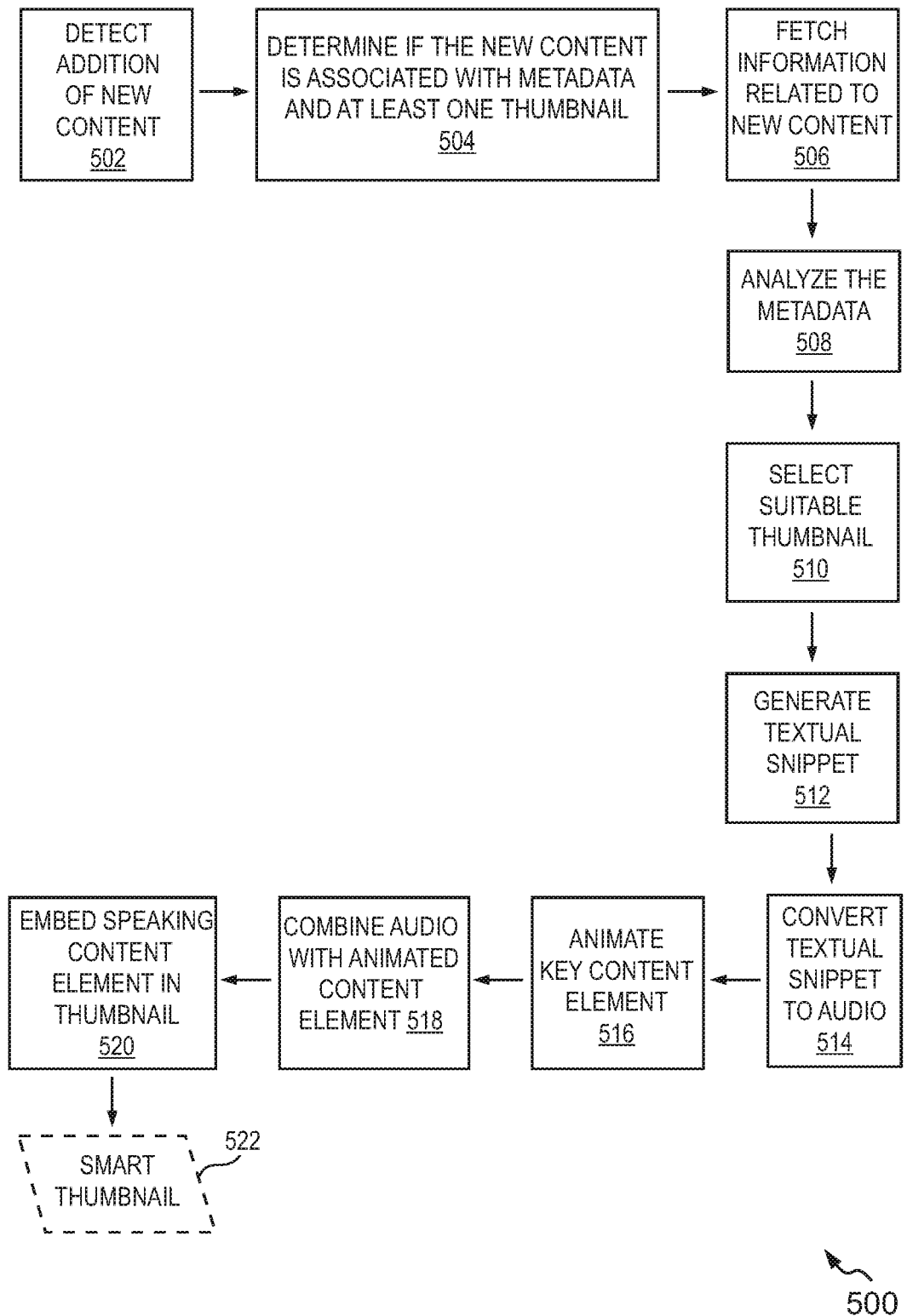
FIG. 5 shows an example process flow for generating a smart thumbnail, in accordance with an embodiment of invention.

FIG. 5 shows an example process flow 500 for generating a smart thumbnail, in accordance with an embodiment of invention. The process flow 500 may be executed by the system 150 (shown in FIG. 2). The process flow starts at 502.

At 502, the system 150 detects an addition of new content in the content store 152 (shown in FIG. 2).

At 504, the system determines if the new content is associated with metadata and at least one thumbnail. If the new content is not associated with the metadata and/or at least one thumbnail, the system 150 is configured to generate the metadata and one or more thumbnails.

At 506, the system 150 receives information such as the one or more thumbnails and the metadata in relation to the new content stored in the content store 152. For example, the system 150 may receive information such as one or more thumbnails, synopsis of the content, video trailer and other metadata related to the content.

At 508, the system 150 analyzes the metadata to identify a key content element of the content.

At 510, the system 150 determines a suitability of a thumbnail to the new content based on the identified key content element and content viewing preference of the viewer to select the thumbnail. The selection of the thumbnail may be performed as explained with reference to FIG. 3.

At 512, the system 150 generates a textual snippet based on the fetched information. The generation of the textual snippet may be performed as explained with reference to FIG. 2.

At 514, the system 150 converts the textual snippet into an audio version using the text-to-speech convertor 402 (shown in FIG. 4).

At 516, the system 150 extracts a portion including the key content element from the selected thumbnail and animates the key content element in the portion to create an impression that the key content element is speaking the audio version. Such an animated key content element is referred to herein as the animated content element.

At 518, the system 150 combines the audio version of the textual snippet with the animated content element to create an impression that the animated content element is speaking the audio version of the textual snippet. The animated content element speaking the audio version of the textual snippet is referred to herein as the speaking content element.

At 520, the system 150 embeds the speaking content element speaking the audio version of the textual snippet in place of the original key content element in the selected thumbnail to generate a smart thumbnail 522. The process flow ends with the generation of the smart thumbnail 522. An example smart thumbnail generated by the process flow 500 is shown in FIG. 6.

Figure 6:
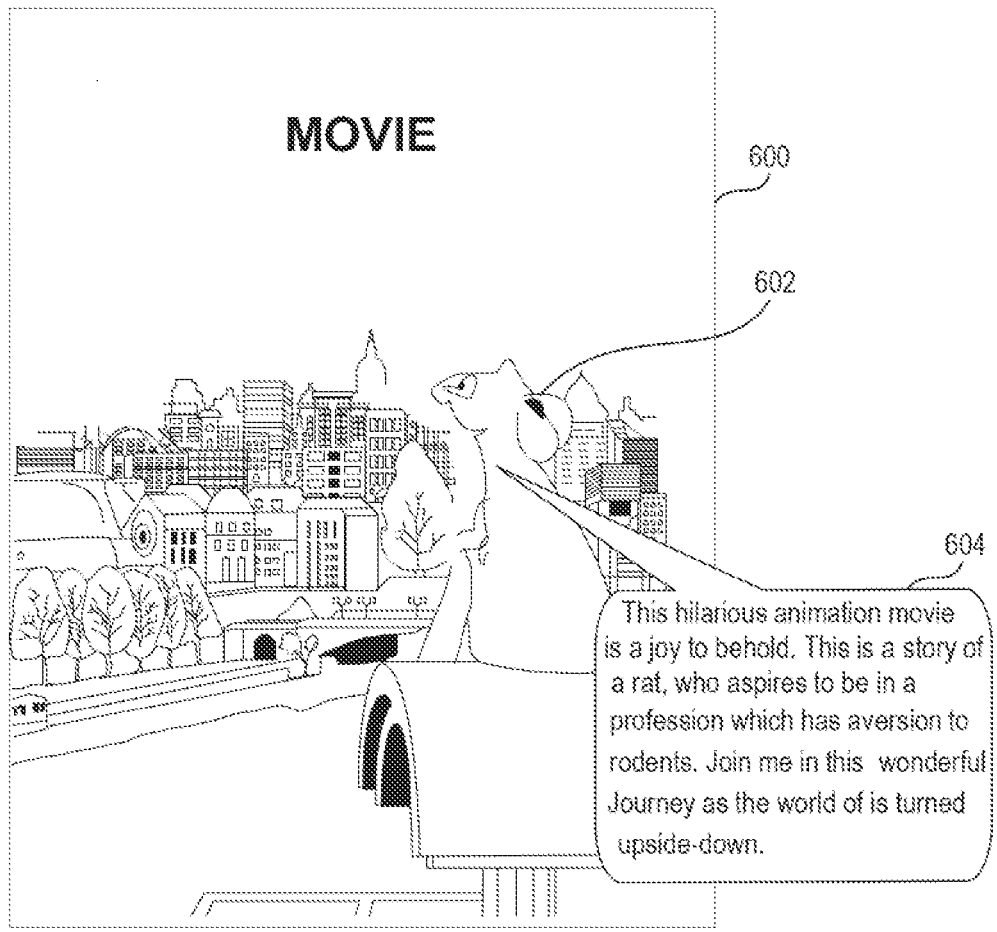
FIG. 6 shows an example representation of a smart thumbnail, in accordance with an embodiment of the invention.

FIG. 6 shows an example representation of a smart thumbnail 600, in accordance with an embodiment of the invention. The smart thumbnail 600 is generated from the thumbnail 100 shown in FIG. 1A. As explained with reference to FIG. 1A, the thumbnail 100 corresponds to a thumbnail image version of a digital poster of the movie. On addition of the movie in the content store 152 (shown in FIG. 2), a thumbnail such as the thumbnail 100 may be selected by a content analyzer 210 of the system 150 shown in FIG. 2. The thumbnail 100 is then processed as per the process flow 500 explained with reference to FIG. 5. More specifically, the key content element in the thumbnail 100, i.e., the rat 602 is extracted or in other words the image of the rat 602 is extracted from the thumbnail 100. The image of the rat 602 is caused to be animated, or in other words the rat 602 is caused to make slight movements, such as movements of a lip portion, a nose and eyes to create an impression that the rat 602 is speaking. Further, the movements of the lip of the rat 602 are synchronized with the textual snippet in the bubble 604 to create an impression that the rat 602 is speaking the textual snippet shown in the bubble 604. Thus, the original thumbnail 100 is processed to generate the smart thumbnail 600.

As the smart thumbnail 600 is capable of describing the content associated with movie, a viewer may learn that this is an animation movie in the comedy genre from Name1 and what is the broad story outline of the movie. The content description may enable the viewer to skip accessing an additional UI, such as the UI 120, or view the video trailer 132 on the UI 120 shown in FIG. 1B, thereby saving time for the viewer and also avoiding consumption of bandwidth resource. Further, the limited space impediment of a thumbnail is also overcome as additional information may now be provided to viewers without the need to squeeze image or text content in the thumbnail image.

As explained with reference to FIGS. 2 to 4, the smart thumbnail configuration is not limited to a single key content element of the thumbnail describing the content associated with the thumbnail. More specifically, if at least one content preference of the viewer is not present in the thumbnail received in relation to the content, then the processing module 202 of the system 150 may be configured to automatically generate a different thumbnail including the at least one content preference of the viewer. Further, the steps of extracting the portion from the thumbnail, causing one or more features of the key content element to be animated to generate animated content element, generating a textual snippet, combining the audio version of the textual snippet with the animated content element to generate the speaking content element, and embedding the speaking content element in the thumbnail to generate the smart thumbnail may be repeated for the different thumbnails generated by the processing module 202. Furthermore, the generated smart thumbnail may include more than one key content element and each content element may speak either about the content or their respective roles in relation to the content. More specifically, the smart thumbnail may include additional speaking content elements as exemplary illustrated in FIG. 7.

Figure 7:
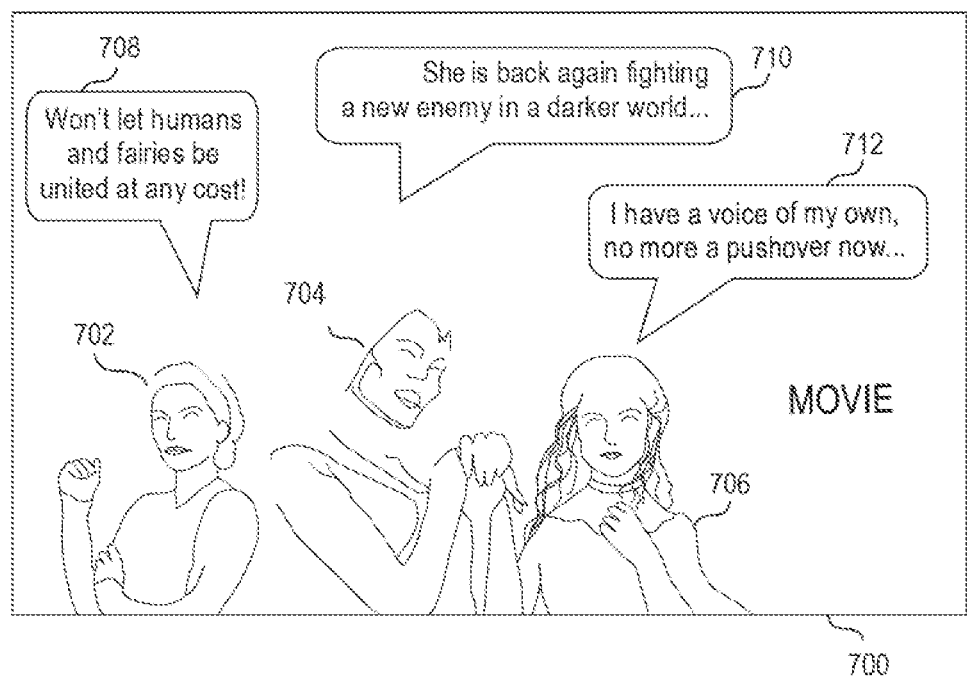
FIG. 7 shows an example representation of a smart thumbnail, in accordance with another embodiment of the invention.

FIG. 7 shows an example representation of another smart thumbnail 700, in accordance with an embodiment of the invention. The smart thumbnail 700 corresponds to a thumbnail image version of a digital poster of another movie. The smart thumbnail 700 is depicted to include three content elements 702, 704 and 706 corresponding to three lead characters of the movie. Further, each content element is capable of speaking about a respective role in the movie as exemplarily depicted using textual snippets in the bubbles 708, 710 and 712, respectively, when a viewer hovers over the smart thumbnail 700. The content elements 702 and 706 are also referred to as additional speaking content elements as these key content elements were chosen in addition to the key content element 704 in relation to the movie content. It is noted that a thumbnail including the chosen three key content elements was selected for generating the smart thumbnail 700 as a viewer may have shown preference to view content titles associated the chosen three key content elements.

As the smart thumbnail 700 is capable of describing the roles of three key content elements, a viewer may learn that this is a fantasy movie and also understand the broad story outline of the movie. The content description may enable the viewer to skip accessing an additional UI, such as the UI 120, or view the video trailer 132 on the UI 120 shown in FIG. 1B, thereby saving time for the viewer and also avoiding consumption of bandwidth resource. Further, the limited space impediment of a thumbnail is also overcome as additional information may now be provided to viewers without the need to squeeze image or text content in the thumbnail image.

The smart thumbnails, such as the smart thumbnails 600 and 700, may be displayed on a display screen of an electronic device associated with a viewer. Further, the one or more speaking content elements in the smart thumbnail are configured to be animated and speak the audio version of the respective textual snippet to the viewer in response to a selection of the smart thumbnail by the viewer or when a viewer hovers a selection pointer over the smart thumbnail. The spoken content, in at least some embodiments, may serve to recommend the content to the viewer. An example use-case of smart thumbnails, such as the smart thumbnails 600 and 700, is explained next with reference to FIGS. 8A and 8B.

Figure 8A:
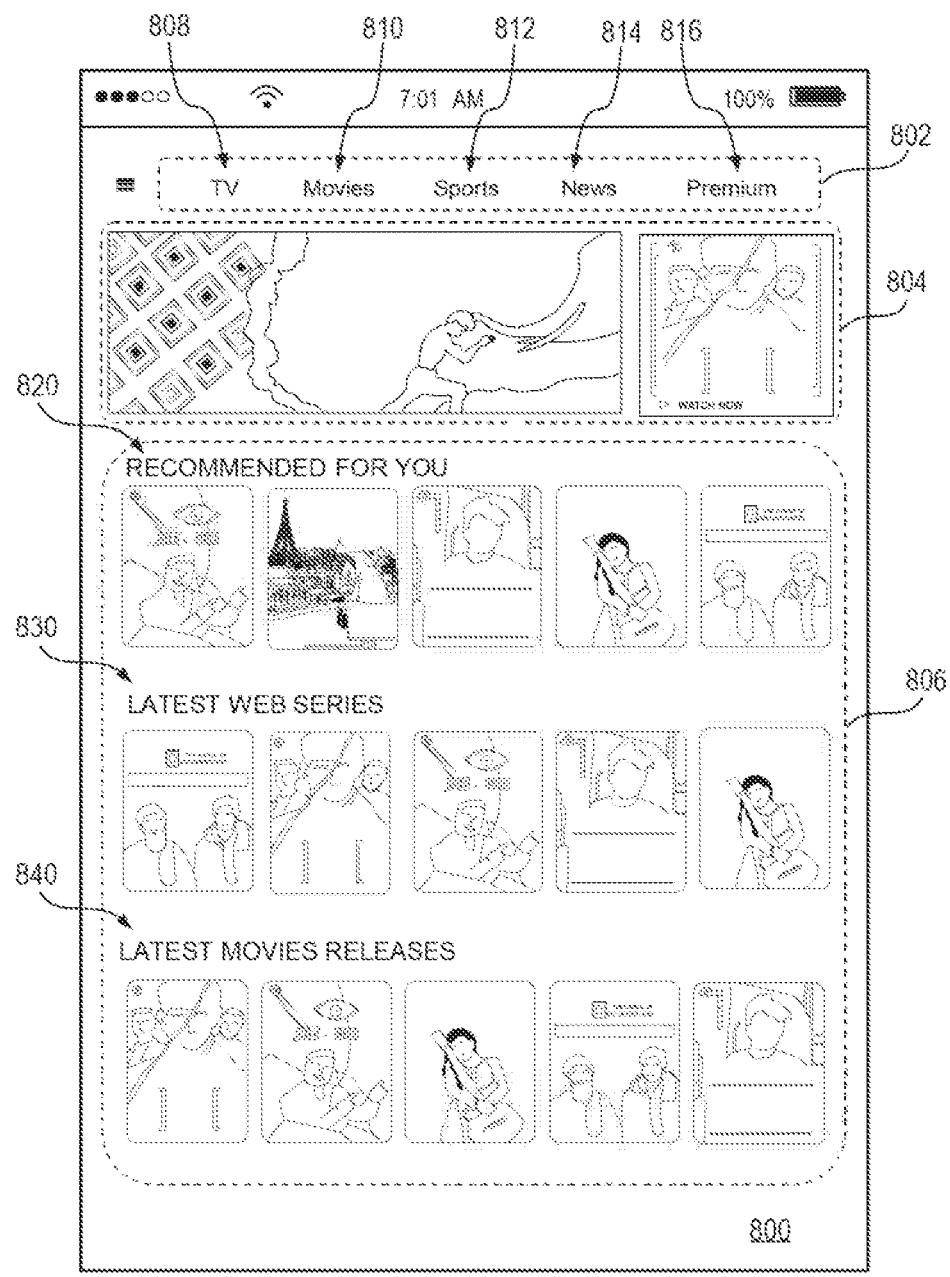
FIG. 8A shows an example representation of a UI displayed to a subscriber of streaming media content subsequent to accessing a mobile application or a Website of an OTT content provider on an electronic device associated with the subscriber, in accordance with an embodiment of the invention.

FIG. 8A shows an example representation of a UI 800 displayed to a subscriber of an OTT streaming media content subsequent to accessing a mobile application or a Website of the OTT content provider on a subscriber's electronic device, in accordance with an embodiment of the invention. The subscriber's electronic device (not shown in FIG. 8A) may be embodied as any electronic device associated with a display screen, such as a mobile phone, a television, a laptop, a tablet device, a wearable device, and the like.

The UI 800 is exemplarily depicted to include a menu portion 802, a trailer portion 804 and a content options portion 806. The menu portion 802 is depicted to display a plurality of content category types, such as TV 808, Movies 810, Sports 812, News 814 and Premium (content) 816. The menu portion 802 may also include an option (not shown in FIG. 8A) to enable a user to search for specific content. The trailer portion 804 is depicted to include a rolling ribbon showcasing the recent content additions with an option to play the content embedded in each content element displayed on the rolling ribbon. The content options portion 806 is depicted to include several rows of content options separated by content categories such as a category 820 related to content recommended based on previously viewed content, a category 830 for latest Web series related content, a category 840 related to latest movie releases, and the like. Each category is associated with several thumbnails corresponding to a plurality of content titles. For example, the category 820 is exemplarily depicted to include four thumbnails associated with four content titles. Each of the thumbnails displayed on the UI 800 may be configured as a smart thumbnail, i.e. a thumbnail capable of describing content or a role of a key content element associated with the thumbnail using an audio version.

Figure 8B:
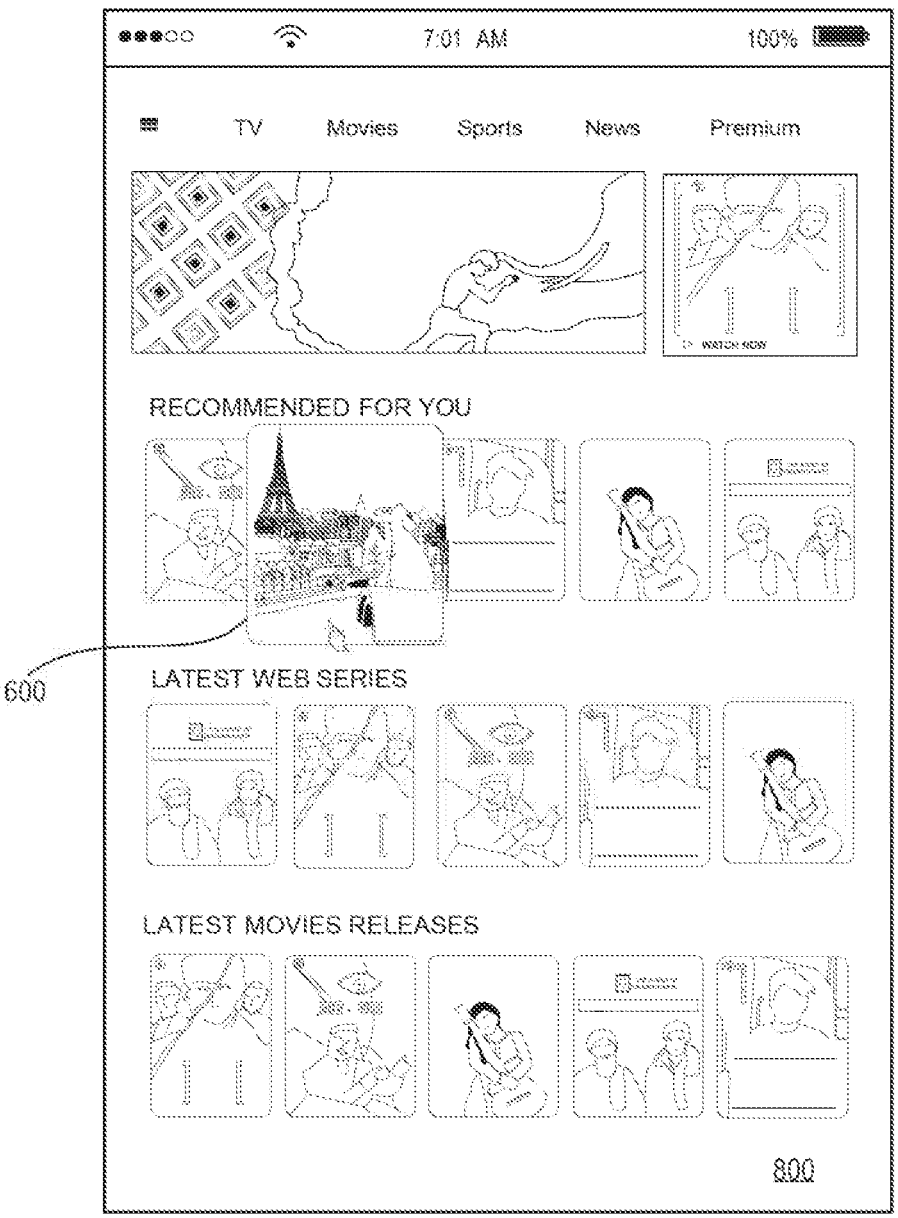
FIG. 8B shows an example representation of a scenario involving a selection of a smart thumbnail on the UI of FIG. 8A, in accordance with an embodiment of the invention.

It is noted that the layout of content options on the UI 800 is shown herein for illustration purposes and that the UI associated with the OTT platform may not be limited to the arrangement of content options as displayed in FIG. 8A. In at least some embodiments, the subscriber actions on the UI 800 may be tracked to learn subscriber preferences and accordingly the content options most likely to be interest to the subscriber may be displayed on the home page UI, such as the UI 800. For example, if the subscriber has previously demonstrated an interest in thriller genre, or a particular type of Web series, or a particular language, or content including particular lead artists, then the relevant content options based on those preferences may be displayed to the subscriber on the UI 800 to increase a likelihood of the subscriber selecting a content option to view. The subscriber may also scroll downwards or rightwards or in either directions to view more content options if the displayed content options are not of interest to the subscriber. Alternatively, the subscriber may also search for content by inputting keywords in a search option (not shown in FIG. 8A). A subscriber may provide a selection input on a content title of interest by either clicking on a thumbnail associated with the content title or by hovering a selection pointer on the thumbnail. FIG. 8B depicts a scenario wherein the subscriber has hovered over the smart thumbnail 600 on the UI 800. On hovering on top of the smart thumbnail 600, the key content element in the smart thumbnail 600, or more specifically, the rat starts speaking content describing the movie as explained with reference to FIG. 6.

Figure 9:
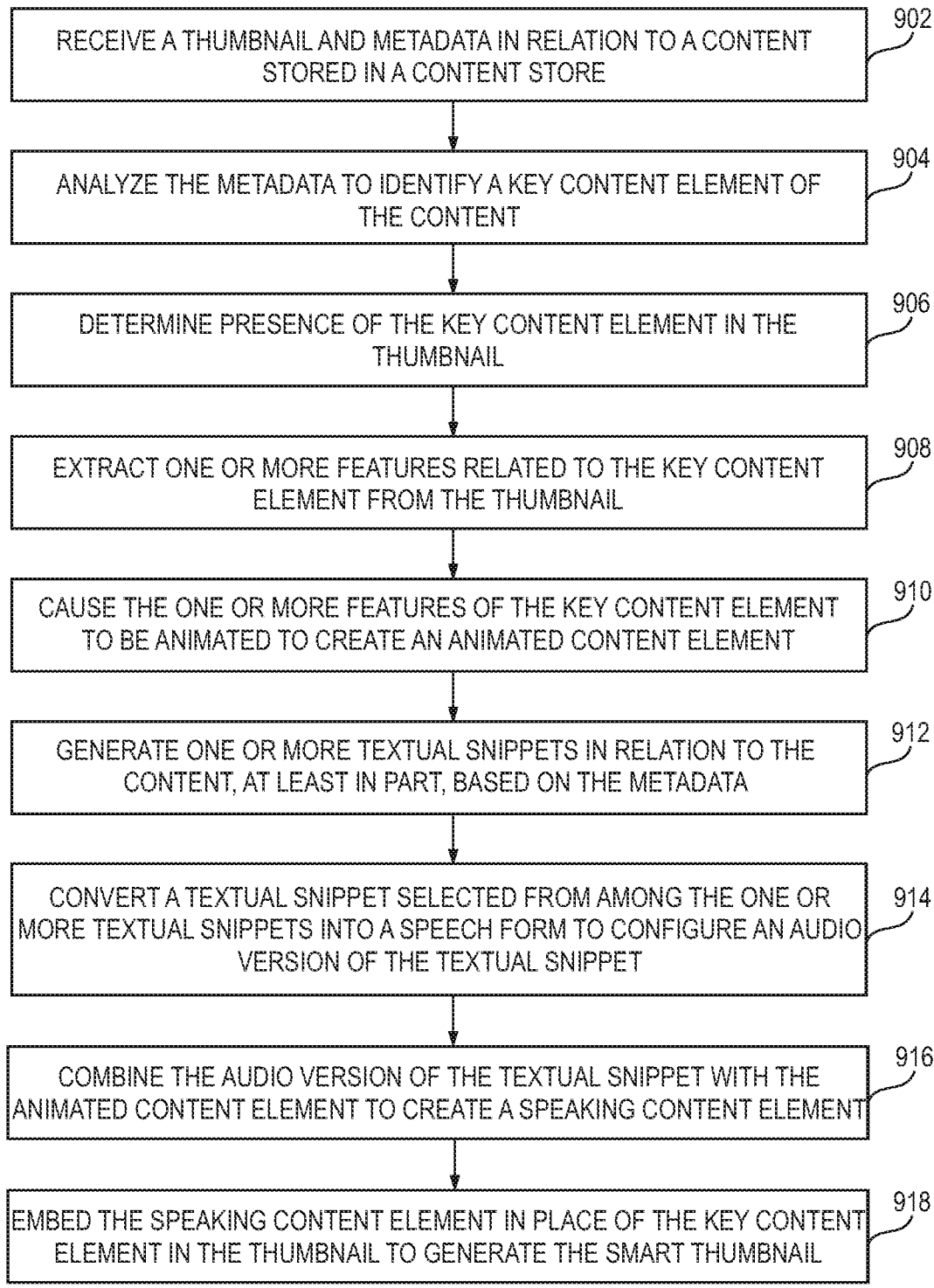
FIG. 9 shows a flow diagram of a method for generating a smart thumbnail, in accordance with an embodiment of the invention.

FIG. 9 shows a flow diagram of a method 900 for generating a smart thumbnail, in accordance with an embodiment of the invention. The various steps and/or operations of the flow diagram, and combinations of steps/operations in the flow diagram, may be implemented by, for example, hardware, firmware, a processor, circuitry and/or by a system such as the system 150 explained with reference to FIGS. 1A-1B to 8A-8B and/or by a different device associated with the execution of software that includes one or more computer program instructions. The method 900 starts at operation 902.

At operation 902 of the method 900, a thumbnail and metadata in relation to a content stored in a content store is received by a processing module of a system, such as the processing module 202 of the system 150 as explained with reference to FIGS. 2 to 8A-8B. As explained with reference to FIG. 2, the processing module may periodically poll a content store such as, the content store 152 to check for addition of new content or the content store may provide a messaging notification to the processing module on addition of each new content. The processing module is further configured to check if the added new content is associated with metadata and at least one thumbnail. If the new content is not associated with metadata and at least one thumbnail, then the processing module is configured to generate the metadata based on the content and thereafter generate a thumbnail. The processing module is further configured to receive the generated metadata and the thumbnail and select the thumbnail for smart thumbnail generation. Alternatively, if the new content is associated with metadata and one or more thumbnails, then the processing module is configured to receive the metadata and the one or more thumbnails, and check if a thumbnail is suitable for smart thumbnail generation vis-à-vis a viewer. If a thumbnail is determined to be suitable, then the thumbnail is selected for smart thumbnail generation. The selection of the thumbnail is explained in detail with reference to FIGS. 2 and 3 and is not explained again herein.

At operation 904 of the method 900, the metadata is analyzed, by the processing module, to identify a key content element of the content.

At operation 906 of the method 900, presence of the key content element in the thumbnail is determined by the processing module. The key content element may be identified based on the synopsis or the highest number of occurrences in the content or in metadata (such as trailer content) as explained with reference to FIG. 2.

If the key content element is present in the thumbnail, at operation 908 of the method 900, a portion including the key content element is extracted from the thumbnail. The extraction of the portion may involve extracting one or more features related to the key content element. At operation 910 of the method 900, one or more features of the key content element are caused to be animated to create an animated content element by the processing module. In at least one embodiment, the one or more features of the key content element may correspond to facial features of the key cast member and, wherein causing the one or more features to be animated includes causing movement of the facial features of the key cast member to mimic facial expressions of the key cast member when the key cast member is speaking.

At operation 912 of the method 900, one or more textual snippets are generated in relation to the content by the processing module at least in part, based on the metadata. To this effect, the processing module may store a plurality of snippet templates including templates corresponding to a plurality of content genres and a plurality of roles of content elements. Each snippet template may include one or more customizable portions. The snippet template may be selected based on the content and the metadata to generate one or more textual snippets as explained with reference to FIGS. 2 to 5. Each textual snippet may include at least one of a description of the content and a description of a role of the key content element in relation to the content.

At operation 914 of the method 900, a textual snippet from among the one or more textual snippets is converted into a speech form to configure an audio version of the textual snippet. In one embodiment, a language of the audio version is chosen based on a language preference of the viewer likely to view the content.

At operation 916 of the method 900, the audio version of the textual snippet is combined with the animated content element by the processing module to create a speaking content element. The speaking content element is configured to provide an impression of the key content element speaking the audio version of the textual snippet.

At operation 918 of the method 900, the speaking content element is embedded in place of the key content element in the thumbnail by the processing module to generate the smart thumbnail. Further, the smart thumbnail is configured to be displayed on a display screen of an electronic device associated with a viewer and the speaking content element in the smart thumbnail is configured to be animated and speak the audio version of the textual snippet to the viewer in response to a selection of the smart thumbnail by the viewer. It is noted that the selection of the smart thumbnail involves hovering of a selection pointer over the smart thumbnail. In at least one embodiment, the speaking content element is configured to recommend the content to one or more viewers likely to view the content. The method ends at operation 918.

In one embodiment, a thumbnail and metadata in relation to a video content stored in a content store is received. The video content may correspond to movies or streaming media content as explained with reference to FIGS. 1 and 7. The metadata is analyzed to identify a key cast member of the video content. The identification of the key cast member may be performed as explained with reference to the identification of the key content element by the content analyzer 210 in FIG. 2. For example, the key cast member may be chosen based on a preference of a viewer likely to view the video content. A presence of the key cast member in the thumbnail may then be checked and if the key cast member is present in the thumbnail, a portion including the key cast member such as one or more facial features related to the key cast member may be extracted from the thumbnail. The extraction of the facial features may be performed as explained with reference to the extraction of the facial features of the rat (i.e. key cast member) in FIG. 6. Further, movement of the one or more facial features of the key cast member is caused to create an animated key cast member. A textual snippet including at least one of a description of the video content and a description of a role of the key cast member in relation to the video content may also be generated based on the metadata related to the video content. The generation of the textual snippet may be performed as explained with reference to FIG. 2. The textual snippet is converted into a speech form to configure an audio version of the textual snippet. A language of the audio version may be chosen based on a language preference of the viewer. The audio version of the textual snippet may be combined with the animated key cast member to create a speaking cast member as explained with reference to FIG. 4. The speaking cast member is configured to provide an impression of the key cast member speaking the audio version of the textual snippet. The speaking cast member is embedded in place of the key cast member in the thumbnail to generate the smart thumbnail. The embedding of the speaking key cast member to generate the smart thumbnail may be performed as explained with reference to FIG. 6 and is not explained again herein.

Various embodiments disclosed herein provide numerous advantages. More specifically, the embodiments disclosed herein suggest techniques for generating smart thumbnails. The smart thumbnails overcome several limitations of conventional thumbnails. As the smart thumbnail is capable of describing the content associated with the thumbnail, a viewer may learn additional information about the content without having to access an additional UI or view a video trailer, thereby saving time for the viewer and also avoiding consumption of bandwidth resource. Further, the limited space impediment of a thumbnail is also overcome as additional information may now be provided to viewers without the need to squeeze image or text content in the thumbnail image. As such, a quality of customer interaction experience provided to the users of the thumbnails is significantly improved.

Although the present invention has been described with reference to specific exemplary embodiments, it is noted that various modifications and changes may be made to these embodiments without departing from the broad spirit and scope of the present invention. For example, the various operations, blocks, etc., described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the apparatuses and methods may be embodied using transistors, logic gates, and electrical circuits (for example, application specific integrated circuit (ASIC) circuitry and/or in Digital Signal Processor (DSP) circuitry).

Particularly, the system 150 and its various components such as the processing module 202, the memory module 204, the I/O module 206 and the communication module 208 may be enabled using software and/or using transistors, logic gates, and electrical circuits (for example, integrated circuit circuitry such as ASIC circuitry), Various embodiments of the present invention may include one or more computer programs stored or otherwise embodied on a computer-readable medium, wherein the computer programs are configured to cause a processor or computer to perform one or more operations (for example, operations explained herein with reference to FIG. 9). A computer-readable medium storing, embodying, or encoded with a computer program, or similar language, may be embodied as a tangible data storage device storing one or more software programs that are configured to cause a processor or computer to perform one or more operations. Such operations may be, for example, any of the steps or operations described herein. In some embodiments, the computer programs may be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g., magneto-optical disks). CD-ROM (compact disc read only memory), CD-R (compact disc recordable), CD-R/W (compact disc rewritable), DVD (Digital Versatile Disc), BD (Blu-ray (registered trademark) Disc), and semiconductor memories (such as mask ROM, PROM (programmable ROM), EPROM (erasable PROM), flash ROM, RAM (random access memory), etc.). Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Various embodiments of the present invention, as discussed above, may be practiced with steps and/or operations in a different order, and/or with hardware elements in configurations, which are different than those which are disclosed. Therefore, although the invention has been described based upon these exemplary embodiments, it is noted that certain modifications, variations, and alternative constructions may be apparent and well within the spirit and scope of the invention.

Although various exemplary embodiments of the present invention are described herein in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:

1. A method for generating a smart thumbnail, the method comprising:
   receiving a thumbnail and metadata in relation to a content stored in a content store;
   analyzing the metadata to identify a key content element of the content;
   determining presence of the key content element in the thumbnail;
   when the key content element is present in the thumbnail, extracting a portion comprising the key content element from the thumbnail, wherein extraction of the portion comprises, at least in part, extracting one or more features related to the key content element;
   causing the one or more features of the key content element to be animated to create an animated content element;
   generating one or more textual snippets in relation to the content, the one or more textual snippets generated, at least in part, based on the metadata;
   converting a textual snippet selected from among the one or more textual snippets into a speech form to configure an audio version of the textual snippet;
   combining the audio version of the textual snippet with the animated content element to create a speaking content element, wherein the speaking content element is configured to provide an impression of the key content element speaking the audio version of the textual snippet; and
   embedding the speaking content element in place of the key content element in the thumbnail to generate the smart thumbnail.

2. The method of claim 1, further comprising:
   checking if the content stored in the content store is associated with the thumbnail and the metadata, wherein the checking is performed prior to receiving the thumbnail and the metadata in relation to the content; and
   causing generation of the thumbnail and the metadata in relation to the content if the content stored in the content store is not associated with the thumbnail and the metadata.

3. The method of claim 2, wherein the generation of the metadata is performed based, at least in part, on the content and, wherein the generated metadata comprises at least one of a listing of one or more content elements in the content, a brief description of the content and a role description of the one or more content elements in the content.

4. The method of claim 3, wherein the generation of the thumbnail is performed based on at least one of the content and the metadata and, wherein the generated thumbnail is configured to include at least one content element preference of a viewer likely to view the content.

5. The method of claim 1, wherein analyzing the metadata comprises:

determining if the metadata includes a listing of one or more content elements in relation to the content;

determining a number of occurrences of each content element in at least one of the metadata and the content; and identifying a content element associated with a highest number of occurrences as the key content element of the content.

6. The method of claim 5, wherein the one or more content elements present in the content are identified from at least one of the metadata and the content if the listing of the one or more content elements is not included in the metadata.

7. The method of claim 1, further comprising:

predicting at least one content element preference of a viewer likely to view the content.

8. The method of claim 7, wherein the key content element is identified from the at least one content element preference of the viewer.

9. The method of claim 8, further comprising:

automatically generating a different thumbnail including the at least one content element preference of the viewer likely to view the content if the key content element is not present in the thumbnail received in relation to the content, the different thumbnail generated using at least one of the content and the metadata associated with the content.

10. The method of claim 1, wherein the smart thumbnail comprises at least one additional speaking content element, each additional speaking content element from among the at least one additional speaking content element corresponding to an additional content element preference included in the smart thumbnail.

11. A system for generating a smart thumbnail, the system comprising:

a memory module for storing instructions; and a processing module configured to execute the instructions to:

receive a thumbnail and metadata in relation to a content stored in a content store;

analyze the metadata to identify a key content element of the content;

determine presence of the key content element in the thumbnail;

when the key content element is present in the thumbnail, extract a portion comprising the key content element from the thumbnail, wherein extraction of the portion comprises, at least in part, extracting one or more features related to the key content element;

cause the one or more features of the key content element to be animated to create an animated content element;

generate one or more textual snippets in relation to the content, the one or more textual snippets generated, at least in part, based on the metadata;

convert a textual snippet selected from among the one or more textual snippets into a speech form to configure an audio version of the textual snippet;

combine the audio version of the textual snippet with the animated content element to create a speaking content element, wherein the speaking content element is configured to provide an impression of the key content element speaking the audio version of the textual snippet; and embed the speaking content element in place of the key content element in the thumbnail to generate the smart thumbnail.

12. The system of claim 11, wherein the processing module is further caused to:

check if the content stored in the content store is associated with the thumbnail and the metadata, wherein the check is performed prior to receiving the thumbnail and the metadata in relation to the content; and cause generation of the thumbnail and the metadata in relation to the content if the content stored in the content store is not associated with the thumbnail and the metadata.

13. The system of claim 12, wherein the generation of the thumbnail is performed based on at least one of the content and metadata and, wherein the generated thumbnail is configured to include at least one content preference of a viewer.

14. The system of claim 11, wherein the processing module is further caused to: predict at least one content element preference of a viewer likely to view the content.

15. The system of claim 14, wherein the key content element is identified from the at least one content element preference of the viewer.

16. The system of claim 15, wherein the processing module is further caused to:

automatically generate a different thumbnail including the at least one content element preference of the viewer likely to view the content if the key content element is not present in the thumbnail received in relation to the content, the different thumbnail generated using at least one of the content and the metadata associated with the content.

17. The system of claim 11, wherein the smart thumbnail comprises at least one additional speaking content element, each additional speaking content element from among the at least one additional speaking content element corresponding to an additional content element preference included in the smart thumbnail.

18. The system of claim 11, wherein the textual snippet comprises at least one of a description of the content and a description of a role of the key content element in relation to the content.

19. The system of claim 11, wherein the processing module is further caused to:

store a plurality of snippet templates, the plurality of snippet templates comprising templates corresponding to a plurality of content genres and a plurality of roles of content elements, wherein each snippet template comprises one or more customizable portions;

select a snippet template from among the plurality of snippet templates based on at least one of a content genre associated with the content and a choice of content element from the content for generating the smart thumbnail; and customize the snippet template based on the content to generate the textual snippet.

20. A method for generating a smart thumbnail, the method comprising:

receiving a thumbnail and metadata in relation to a video content stored in a content store;

analyzing the metadata to identify a key cast member of the video content, the key cast member chosen based on a preference of a viewer likely to view the video content;

determining presence of the key cast member in the thumbnail;

when the key cast member is present in the thumbnail, extracting a portion comprising the key cast member from the thumbnail, wherein extraction of the portion comprises, at least in part, extracting one or more facial features related to the key cast member;

causing movement of the one or more facial features or the key cast member to create an animated key cast member;

generating a textual snippet comprising at least one of a description of the video content and a description of a role of the key cast member in relation to the video content, the textual snippet generated, at least in part, based on the metadata related to the video content;

converting the textual snippet into a speech form to configure an audio version of the textual snippet, a language of the audio version chosen based on a language preference of the viewer;

combining the audio version of the textual snippet with the animated key cast member to create a speaking cast member, wherein the speaking cast member is configured to provide an impression of the key cast member speaking the audio version of the textual snippet; and embedding the speaking cast member in place of the key cast member in the thumbnail to generate the smart thumbnail.

\* \* \* \* \*